W. H. COOK.
SHOCK ABSORBER.
APPLICATION FILED APR. 12, 1913.
1,066,999.
Patented July 8, 1913.
2 SHEETS—SHEET 1.
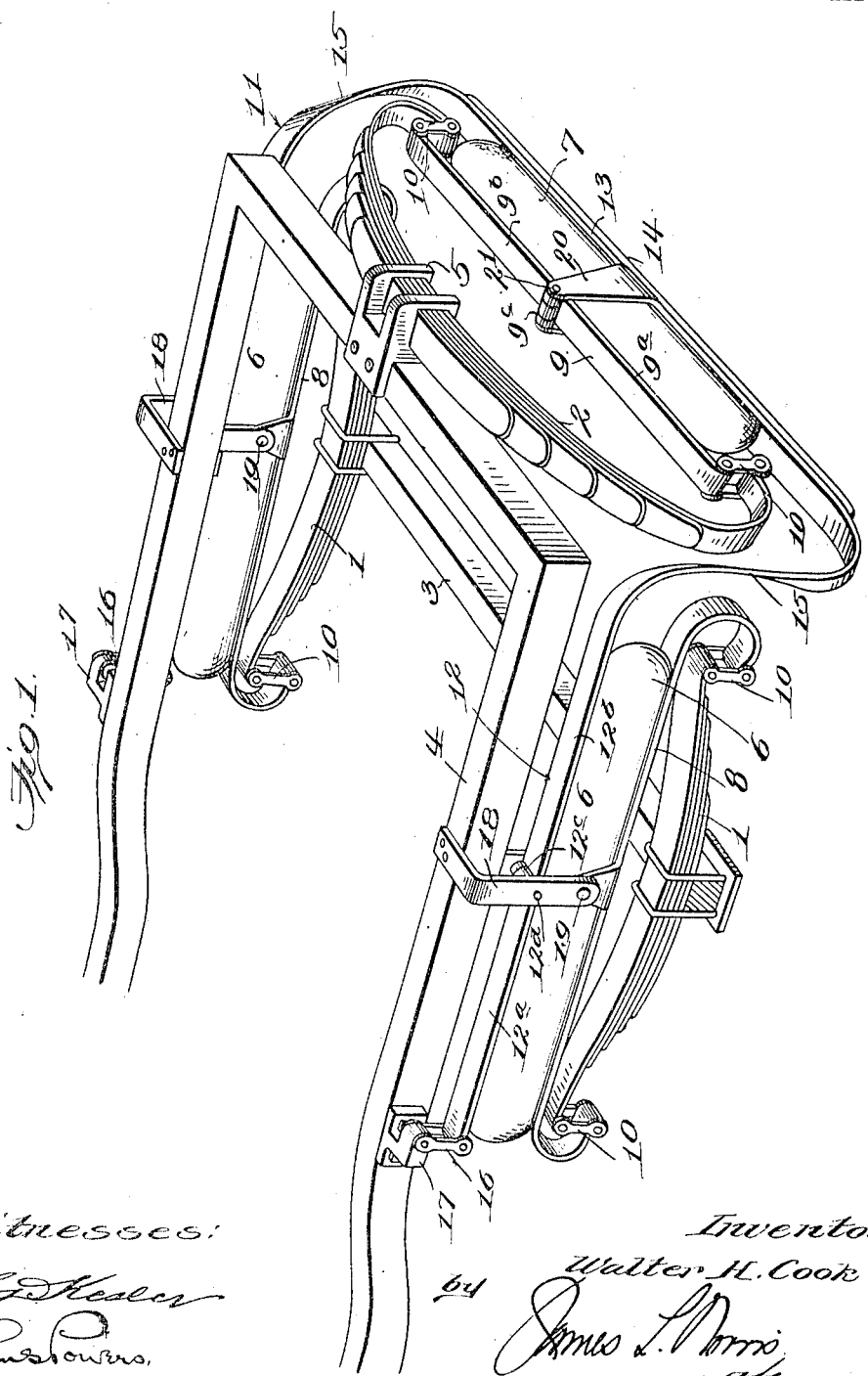
Witnesses:
Inventor
Walter H. Cook
by
James L. Norris
Attorney

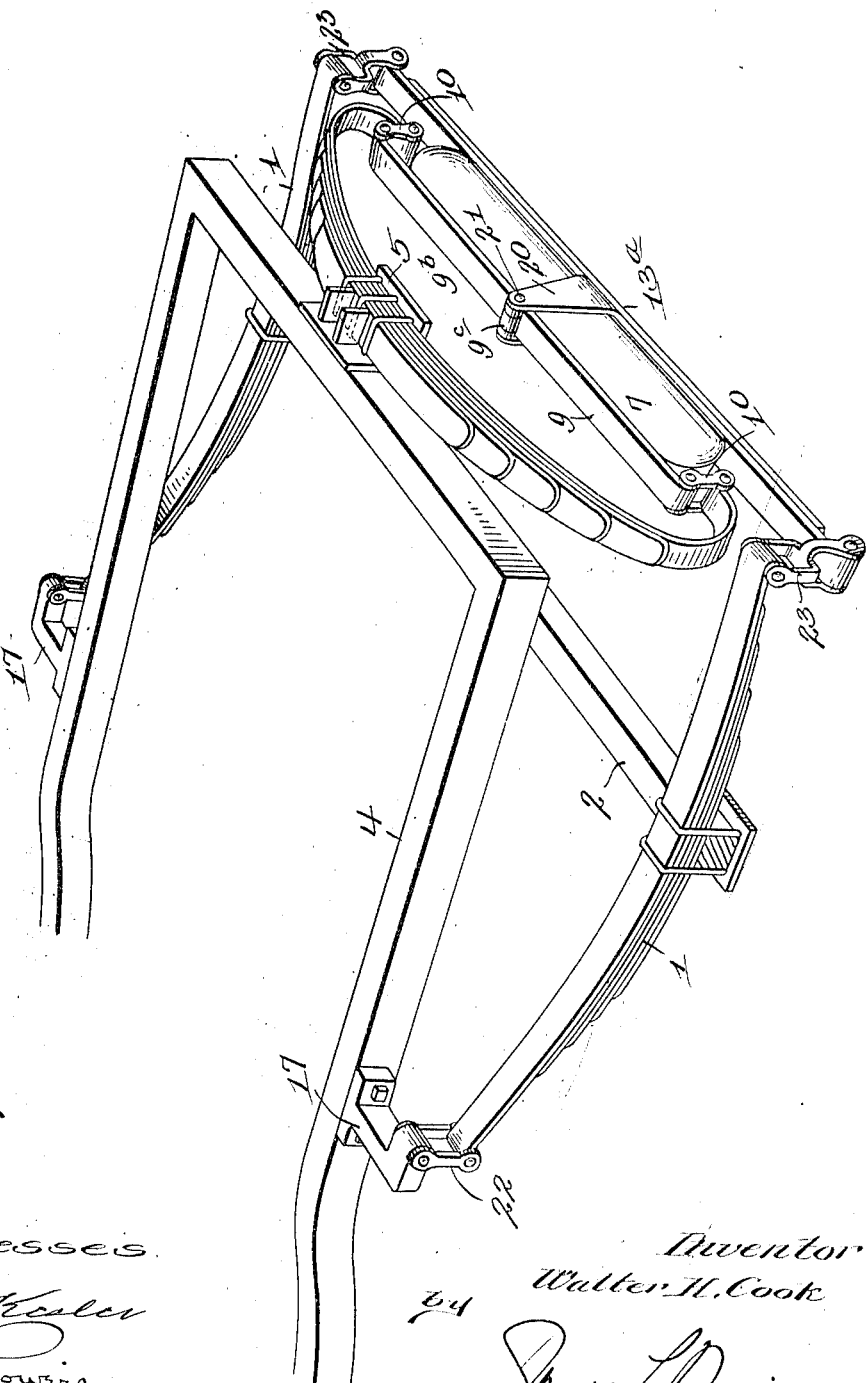

UNITED STATES PATENT OFFICE.

WALTER H. COOK, OF NEW ORLEANS, LOUISIANA.

SHOCK-ABSORBER.

1,066,999.

Specification of Letters Patent. Patented July 8, 1913.

Application filed April 12, 1913. Serial No. 760,784.

*To all whom it may concern:*

Be it known that I, WALTER H. COOK, a citizen of the United States, residing at New Orleans, in the parish of Orleans and State of Louisiana, have invented new and useful Improvements in Shock-Absorbers, of which the following is a specification.

This invention relates to improvements in shock absorbers, and it proposes an effective combination of interconnected longitudinal and transverse shock absorbing agencies for use at the sides and rear end of the car, and the object of the invention is to provide a combination of the character stated whereby a maximum shock absorbing action is developed and the body of the car is substantially relieved of tilting movements or vibrations in longitudinal, as well as transverse, directions; and whereby existing standards of construction are not interfered with.

The improved shock absorbing organization preferably utilizes certain features of construction shown in my patents dated April 8, 1913, and consisting more especially in an elongated air cushion, a shock transmitting bar connected to the main spring and acting on the air cushion, forming a bearing therefor and a frame part which also forms a bearing for the air cushion opposed to the bearing afforded by the shock transmitting bar.

Other objects and advantages will appear as the description proceeds.

Embodiments of the invention are illustrated in the accompanying drawings, wherein:—

Figure 1 is a perspective view showing a preferred construction in which the features of the invention are incorporated; and Fig. 2 is a similar view showing a modified construction.

Similar characters of reference designate corresponding parts throughout the several views.

Commercial trucks and large pleasure cars frequently embody an arrangement at the rear thereof of longitudinal and transverse springs. It is to such an organization that the present invention pertains.

The longitudinal springs are shown at 1 and the transverse spring at 2, and as is usual with this arrangement, the springs 1 are mounted on the axle 3 and the spring 2 is secured to the vehicle frame 4 at the rear thereof, preferably by means of a centrally located clip 5.

In the construction shown in Fig. 1, a shock absorbing organization is combined with each spring, these organizations preferably including elongated air cushions 6 and 7 for the respective springs 1 and 2, and shock transmitting bars 8 and 9 for the respective air cushions 6 and 7.

The springs 1 are arranged below the bars 8 and the latter engage the under side of the air cushions 6. The spring 2 is arranged above the bar 9 and the latter engages the upper side of the air cushion 7. The bars 8 and 9 are connected at their ends to the ends of their respective springs, preferably by suspension links 10.

The cushions 6 and 7 work between the respective bars 8 and 9 and a bearing frame 11, which, viewed in plan, has a U-shaped outline, and includes side bars 12 which engage the upper sides of the cushions 6 and a cross bar 13, which engages the under side of the cushion 7 and is preferably reinforced, to secure the desired rigidity, by an integral or attached rib 14. The side bars 12 and the cross bar 13 are connected by hangers 15 which are preferably an integral part of the frame 11, and depend from the rear ends of the side bars 12, supporting the bar 13 approximately in the plane of the axle 3.

The frame 11 is suspended from the frame 4, preferably by links 16 depending from brackets 17 secured to the side bars of the frame 4, and connected to the forward ends of the bars 12. The latter are preferably made in sections 12$^a$ and 12$^b$ hingedly connected at 12$^c$ and the pins of the hinge joints 12$^d$ also attach the bars 12 to brackets 18, which depend from the side bars of the frame 4 and are formed as yokes to straddle the cushions 6. The shock transmitting bars 8 are also pivoted to the bracket 18, the connection being indicated at 19. The connections 19 are located somewhat rearwardly of the centers of the bars 8, and the connections between the springs 1 and the axle 3 are similarly located with reference to said springs, this arrangement being selected to compensate for the weight of the parts at the rear end of the shock absorbing organization and to insure that the springs shall be uniformly balanced.

From the above description, it will be apparent that each bracket 18 forms, in effect, a connection between the shock transmitting bar 8 and the bearing bar 12. A similar relation obtains between the shock transmitting bar 9 and the bearing bar 13, the latter having at its sides brackets 20 to which the bar 9 is pivoted as at 21. The bar 9 is preferably made in sections 9ª and 9ᵇ, hingedly connected at 9ᶜ, the pivot 21 forming a part of the hinge joint 9ᶜ. The frame 11 provides a bed, so to speak, for the several cushions 6 and 7. The first jolt of the car is taken up by the air cushions 6, the resultant compression thereof causing an air wave or pulsation which augments the cushioning action at the rear of the vehicle, both by resistance to the bars 8 as well as by the production of a slight relative upward displacement of that portion of the frame 11 which is in the rear of the pivots 19, such displacement being resisted by the cushion 7, which, with its appurtenances, is so arranged as to efficiently maintain the transverse equilibrium of the car.

In the construction shown in Fig. 2, the shock absorbing agencies at the sides of the car are omitted and the springs 1 are directly connected at their forward ends to the frame 4, through the intermediary of links 22. Cardan or gimbal joint suspensions 23 are interposed between the rear ends of the springs 1 and a transverse bar 13ª, which corresponds to the bar 13 in the organization first described. In all other respects the shock absorbing organization at the rear of the car is, in the arrangement shown, similar to the corresponding organization in the form first described.

It will be apparent that the bar 13 or 13ª, as the case may be, forms a bed for the cushion 7 and opposes the action of the shock transmitting bar 9, yet in turn, is resiliently supported or suspended from the main springs, so as to resist and be subject to the pulsations of the main springs. In this way, the springs mutually counteract one another and the shock absorbing action is unified and efficient. The form shown in Fig. 1 is preferred for heavier vehicles, since it obviously has greater shock absorbing power than the form shown in Fig. 2.

It will be understood that the invention is not limited to the two forms of construction herein shown, but that it includes within its purview minor limitations and combinations, and substitution of parts, all of which come within the scope of the succeeding claims.

Having fully described my invention, I claim:

1. The combination with a vehicle frame, an axle, side springs secured to the axle and a transverse spring secured to the frame of a cushioning element associated with said transverse spring and arranged below the same, a shock transmitting element connected to said transverse spring and engaging the upper side of said cushioning element, and a transverse bar engaging the under side of the cushioning element and being resiliently suspended by means of support from said side springs.

2. The combination with a vehicle frame, an axle, side springs secured to the axle and a transverse spring secured to the frame, of an elongated air cushion arranged transversely below said transverse spring, a shock transmitting bar connected to the ends of said transverse spring and engaging the upper side of said cushion, and a transverse bar engaging the under side of said cushion as a bed therefor, and resiliently suspended by means of support from said side springs.

3. The combination with a vehicle frame, an axle, side springs secured to the axle and a transverse spring secured to the frame of a cushioning element associated with the transverse spring and arranged below the same, cushioning elements associated with the side springs and arranged above the same, and a U-shaped frame having side bars engaging the second named cushioning elements from above and a cross bar engaging the first named cushioning element from below.

4. The combination with a vehicle frame, an axle, side springs secured to the axle and a transverse spring secured to the frame of a transverse air cushion associated with the transverse spring and arranged below the same, longitudinal air cushions associated with the side springs and arranged above the same, a U-shaped frame having side bars engaging the longitudinal air cushions from above and a cross bar engaging the transverse air cushion from below, and shock transmitting bars connected to the ends of the respective springs and engaging said air cushions in opposition to the bars of said U-shaped frame.

5. The combination with a vehicle frame, of side springs and a transverse spring, the latter facing oppositely to the former, cushioning elements associated with said springs, and a U-shaped frame having side bars and a transverse bar engaging said cushioning element, the transverse bar facing oppositely to the side bars.

6. The combination with a vehicle frame, an axle, side springs secured to the axle and a transverse spring secured to the frame of longitudinal air cushions associated with the side springs, and a transverse air cushion associated with the transverse spring, the longitudinal cushions being arranged above the side springs and the transverse cushion being arranged below the transverse spring, a U-shaped frame including side bars engaging the longitudinal cushions from above and a transverse bar engaging the transverse cushion from below, and shock transmitting bars connected to the ends of said springs and engaging said cushions in opposition to the bars of said U-shaped frame, the side bars of the latter being connected to the vehicle frame and being yieldable under the pressure transmitted thereto by said longitudinal air cushions.

7. The combination with a vehicle frame, an axle, side springs and a transverse spring, of longitudinal air cushions arranged above the side springs, a cushioning element arranged below the transverse spring, a U-shaped frame having side bars engaging said air cushions from above, and a transverse bar engaging said cushioning element from below and shock transmitting bars associated with said side springs and engaging said air cushions from below.

8. The combination with a vehicle frame, an axle, side springs, and a transverse spring, of cushioning elements arranged above the side springs, a transverse air cushion arranged below the transverse spring, a U-shaped frame having side bars engaging said cushioning elements from above, and having a transverse bar engaging said air cushion from below, and a shock transmitting bar associated with said transverse spring and engaging said air cushion from above.

9. The combination with a vehicle frame, an axle, side springs connected to the axle, a transverse spring connected to the frame, cushioning elements arranged above the side springs, bars engaging said cushioning elements from above, and means for subjecting said bars to the action of the transverse spring.

10. The combination with a vehicle frame, an axle, side springs connected to the axle, a transverse spring connected to the frame, a cushioning element arranged below the transverse spring, a bar engaging the cushioning element from below, and means for subjecting said bar to the action of said side springs.

In testimony whereof I have hereunto set my hand in presence of two subscribing witnesses.

WALTER H. COOK.

Witnesses:
CHARLES H. NASH,
ROBERT WATERMAN.